Jan. 1, 1946. V. W. SHERMAN ET AL 2,392,069
LOCK-NUT DEVICE
Filed Dec. 11, 1943

INVENTORS
VERNON W. SHERMAN
ROY KETCHEM
BY Edward D. Kinney
ATTORNEY

Patented Jan. 1, 1946

2,392,069

UNITED STATES PATENT OFFICE 2,392,069

LOCK-NUT DEVICE

Vernon W. Sherman, Summit, and Roy Ketchem, Newark, N. J., assignors to International Safety Lock Nut Corporation, New York, N. Y., a corporation of Delaware Application December 11, 1943, Serial No. 513,830

7 Claims. (Cl. 151—19)

The improvements of the present invention pertain to lock-nut devices and have for their object to provide a simplified lock-nut structure of the type wherein the body portion of the nut proper is formed with an integral collet or gripping portion and with a related annular and inwardly inclined wall portion for coaction with a deflecting washer to transmit inward pressure on the gripping collet.

Lock-nut devices of this general character have heretofore been made with split collet portions formed by saw cuts thereby involving an expensive production operation and likewise producing a structural form conducive to a deleterious permanent set of the deflected metal portion under severe pressures. The latter is such as to impair the value of the device for repeated use as is generally desired. In accordance with the present improvement there is provided a lock-nut of the described type having a nut proper formed with an integral cylindrical collet portion unbroken circumferentially or of annular form continuous in its circular section and of such reduced cross section as to permit of its being resiliently distorted into an elliptical cross sectional formation, under deflection, for gripping action. The improvements further include the association and cooperative employment with the nut having an annular collet gripping portion of an inwardly deflecting wall and a special form of cooperating split ring or washer. This washer is formed with an external inclined or angular wall for coaction with the nut camming surface to effect inward deflection of the collet portion and has its inner periphery of special form or contour with relation to the collet so as to accommodate or provide clearance for the elliptical deformation, or expansion of the latter on a major axis under condition of deformation, while maintaining a desired extended area of bearing contact therewith.

The described and other improved features of the present invention will be more fully understood by reference to the accompanying drawing wherein like reference characters are applied to the corresponding parts in the several views.

Figure 1:
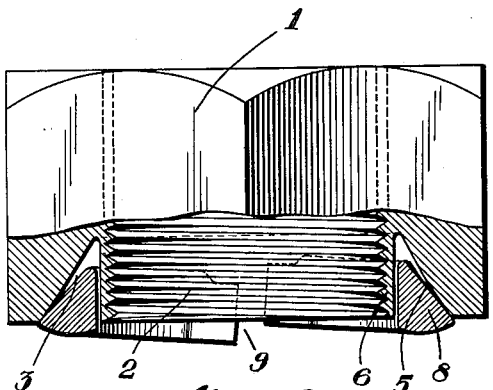
Fig. 1 is a view in side elevation of the improved lock-nut assembly showing a portion broken away in central vertical section and showing the parts in expanded or initial position of assembly.
Figure 3:
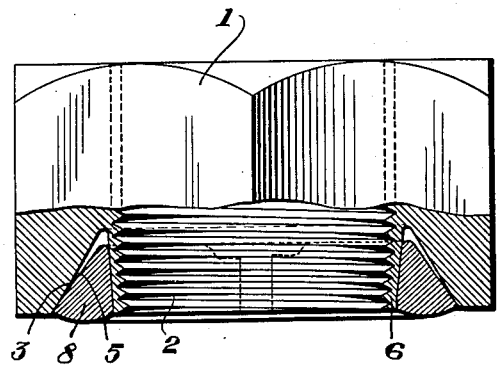
Fig. 3 is a view similar to Fig. 1 with the parts shown in tightened or locking position.
Figure 2:
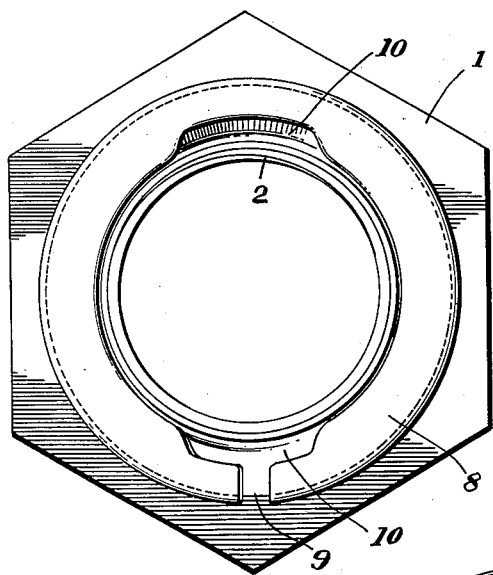
Fig. 2 is a bottom plan view thereof.
Figure 4:
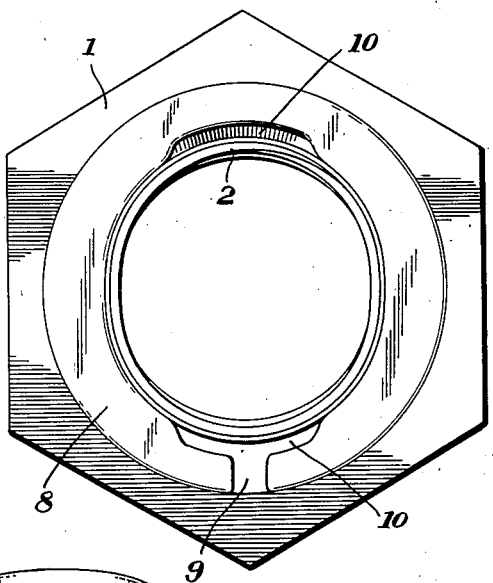
Fig. 4 is a bottom plan view of the parts in the position of Fig. 3.

Referring more specifically to the drawing, wherein a preferred embodiment of the features of the invention is illustrated, 1 indicates a hexagonal nut internally threaded at 2 for threaded engagement with the bolt or screw stud to which it is applied. One face of the nut as shown is formed with the annular groove 3 which in this case is concentric with the bolt hole. The inner wall of the groove is parallel to the longitudinal axis of the nut and the outer wall of the groove is at an angle to this axis with an inward inclination from the outer face of the nut so as to be wedge-shaped with the smaller end toward the nut body interior.

The grooved formation as illustrated provides a centrally located collet or sleeve-like portion 6 between the inner wall of the groove and the bolt hole which, in the present instance, is of relatively thin cross-sectional area and of a critical thickness to determine that the collet so formed shall be deformable to effect a gripping distortion to a determined degree and manner by the coaction therewith of a special form of deflecting washer now to be described.

The washer 8 is desirably helicoidal in shape and is split by the break in its surface continuity as shown at 9. This washer is wedge-shaped in its cross section and of a configuration somewhat similar to that of the groove 3 with which it coacts. The normal or expanded diameter of the washer is slightly greater than that of the coacting groove from which it results that, upon assembling of the nut and associated washer with the latter engaging a bearing surface, tightening up of the nut will cause the washer to enter the groove with an inward deflection of and reduction of the diameter of the washer as the result of the camming action of the engaged inclined surfaces as is readily understood. As will be noted with reference to Fig. 1 the inclined wall of the groove is of less angularity with relation to the longitudinal axis of the nut than that of the external inclined surface of the washer in its normal or expanded condition. As a result of this the camming action of the washer as it enters the groove not only reduces the circumferential diameter but at the same time imparts a turning movement or angular deflection to the washer which by reason of the engagement of its inner parallel wall with the collet outer surface will transmit a like deflection to the engaged portion of the latter. The resulting inward deflection of the collet produces a tight frictional gripping engagement with the threads of the bolt to effect a secure locking action therewith. The inward deflection of the collet thus produced is effected with a distortion of the collet wall form from the cylindrical to an elliptical formation which in accordance with the invention is permitted by the special form of the washer.

To permit of this collet deflection or distortion, the inner surface of the washer is formed with oppositely positioned, enlarged grooves or recesses 10—10. These recesses, as illustrated, in their circumferential dimension may desirably extend about 30° to each side of the central vertical axis as shown with rounded surface junction with the thicker body portion of the washer. With this arrangement opposite end clearance is provided to accommodate for elliptical deformation of the collet while affording a desirable extended bearing area thereon. As a result of this improved construction, upon tightening up of the nut upon a threaded stud or bolt, with the washer disposed against a bearing surface, opposite portions of the collet wall will be deflected inwardly into locking frictional engagement with the engaged threads of the stud and under such pressure as to effect to a limited degree a predetermined permanent set of the metal such as to be effective for frictional gripping even with a partial loosening of the nut after extended use under extreme vibration. While the washer is shown and described as of helicoidal form, with the advantage of imparting pressure on the nut longitudinally of the bolt with a resulting frictional locking action, it may if desired be of a normally flat form. The improved distortion collet type or lock-nut as disclosed has proven to be highly efficient over long periods of heavy duty vibration; is effective in maintaining a frictional grip under conditions of partial loosening of the nut as may occur after long extended use or upon stretching of the bolt and, moreover, by a properly proportioning of the collet thickness, retains sufficient resiliency to permit of repeated re-use as may be desired.

Figures 5, 6:
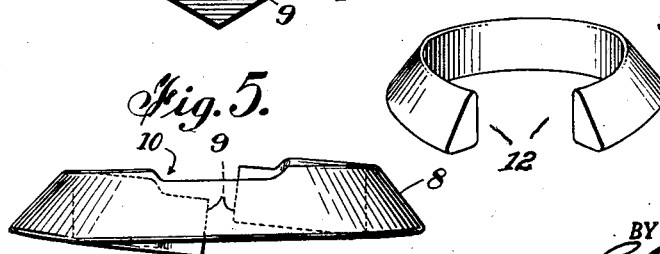
Fig. 5 is an elevational view of the spring washer.
Fig. 6 is a perspective view illustrating a simplified form of washer.

A further desirable embodiment of features of the invention may be obtained by the employment of the described nut structure of the materially simplified form of resilient washer as illustrated in Fig. 6 consisting of a split ring of the described wedge cross sectional form and having a widened or enlarged separation gap 12 which may extend for approximately 60° of the circumference. The widened gap of this simplified form as will be readily understood provides clearance accommodation for elliptical distortion of the collet material at one side thereof only and adapted to permit of the reduction in the collet diameter under the bolt gripping deformation thereof.

Having described our invention, we claim:

1. A lock-nut arrangement of the character described comprising a nut having a threaded bore and formed with a groove in one face thereof to provide a collet portion, said collet being of continuous cylindrical wall form adapted for approximate elliptical distortion, said groove having its outer wall surface inclined inwardly toward the longitudinal axis and a coacting split deflecting washer having an inclined outer surface for camming engagement with the groove inclined surface and proportioned to effect inward deflection of the collet for gripping engagement and formed with two oppositely positioned internal portions comprising recesses to permit an approximately elliptical distortion of the collet.

2. A lock-nut arrangement comprising a nut having a threaded bore and formed with a groove in one face thereby to provide a collet portion, said collet being of continuous cylindrical wall form adapted for approximate elliptical distortion, said groove having its outer wall surface inclined inwardly toward the longitudinal axis and a coacting split deflecting washer of normal helicoidal formation and having an inclined outer surface for camming engagement with the groove inclined surface and proportioned to effect inward deflection of the collet for gripping engagement and formed with two oppositely positioned internal portions comprising recesses to permit of an approximately elliptical distortion of the collet.

3. A lock-nut arrangement comprising a nut having a threaded bore and formed with a groove in one face thereof to provide a collet portion, said collet being of continuous wall form adapted for distortion, said groove having its outer wall surface inwardly inclined toward the longitudinal axis and a coacting split deflecting washer having an inclined outer surface for camming engagement with the groove inclined surface and proportioned to effect inward deflection of the collet portion for gripping engagement and formed with two oppositely positioned internal portions comprising recesses to accommodate for radial outward distortion of the collet and said recesses extending circumferentially for about 60°.

4. A lock-nut arrangement of the character described comprising a nut having a threaded bore and formed with a groove in one face thereof to provide a collet portion integral with the body of the nut, said collet being of continuous cylindrical wall form adapted for approximate elliptical distortion, said groove having its outer wall surface inclined inwardly toward the longitudinal axis, and a coacting split deflecting washer having an inclined outer surface for camming engagement with the groove inclined surface and having a normal angularity greater than that of the groove inclined surface and said washer being of wedge shaped cross section with its outer transverse section of greater width than the normal width of the groove to effect inward deflection of the collet for gripping engagement and formed with two oppositely positioned internal portions comprising recesses to permit of approximately elliptical distortion of the collet.

5. A lock-nut arrangement comprising a nut having a threaded bore and formed with a groove in one face thereof to provide a collet portion, said collet being of cylindrical wall form adapted for approximate elliptical distortion, said groove having its outer wall surface inclined inwardly toward the longitudinal axis and a coacting split deflecting washer of normal helicoidal formation and having an inclined outer surface for camming engagement with the groove inclined surface and of relatively greater angularity and said washer being proportioned to effect inward deflection of the collet for gripping engagement and having two oppositely positioned internal portions comprising recesses to permit of an approximately elliptical distortion of the collet, said recesses extending circumferentially for over 50°.

6. A lock-nut arrangement of the character described comprising a nut having a threaded bore and formed with a groove in one face thereof to provide a collet portion, said collet being of substantially cylindrical wall form adapted for approximate elliptical distortion, said groove having its outer wall surface inclined inwardly toward the longitudinal axis and a coacting split deflecting washer having an inclined outer surface for camming engagement with the groove inclined surface and proportioned to effect inward deflection of the collet for gripping engagement and formed with two oppositely positioned internal portions comprising recesses to permit of approximately elliptical distortion of the collet.

7. A lock-nut arrangement comprising a nut having a threaded bore and formed with a groove in one face thereby to provide a collet portion, said collet being of continuous cylindrical wall form and said groove having its outer wall surface inclined inwardly toward the longitudinal axis and a coacting deflecting washer having an inclined outer surface for camming engagement with the groove inclined surface and proportioned to effect inward deflection of the collet for gripping engagement and internally recessed at two diametrically disposed portions to permit outward distortion of a collet wall portion into each of said two diametrically disposed portions.

VERNON W. SHERMAN.
ROY KETCHEM.